(12) United States Patent
Shin et al.

(10) Patent No.: US 12,650,402 B2
(45) Date of Patent: Jun. 9, 2026

(54) NUCLEIC ACID DETECTION WITH A NANOGAP ELECTRICAL SENSOR

(71) Applicant: Robert Bosch GmbH, Stuttgart (DE)

(72) Inventors: Young Shik Shin, Mountain View, CA (US); Nadezda Fomina, Redwood City, CA (US); Christopher Johnson, San Carlos, CA (US); Armin Darvish, Brisbane, CA (US); Gabrielle Vukasin, San Jose, CA (US); Gary Yama, Mountain View, CA (US); Christoph Lang, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 148 days.

(21) Appl. No.: 18/590,309

(22) Filed: Feb. 28, 2024

(65) Prior Publication Data

US 2025/0271389 A1 Aug. 28, 2025

(51) Int. Cl.
G01N 27/327 (2006.01)

(52) U.S. Cl.
CPC .................................. G01N 27/3278 (2013.01)

(58) Field of Classification Search
CPC ..................... G01N 27/3278; G01N 33/48721
See application file for complete search history.

(56) References Cited

U.S. PATENT DOCUMENTS

| | | | |
|---|---|---|---|
| 2003/0141189 A1* | 7/2003 | Lee ...................... | C12Q 1/6869 204/600 |
| 2006/0275778 A1* | 12/2006 | Wu ................... | G01N 33/48721 977/924 |
| 2009/0215156 A1* | 8/2009 | Chung ................... | B82Y 15/00 430/323 |
| 2010/0292101 A1* | 11/2010 | So ........................ | C12Q 1/6869 506/23 |

(Continued)

OTHER PUBLICATIONS

On-line Cambridge Dictionary definition of "gap", downloaded Sep. 16, 2025, https://dictionary.cambridge.org/dictionary/english/gap (Year: 2025).*

(Continued)

*Primary Examiner* — Alexander S Noguerola
(74) *Attorney, Agent, or Firm* — Brooks Kushman P.C.

(57) ABSTRACT

Systems and methods to detect a polynucleotide strand in a sample during the early stage of amplification cycles. A metal-insulator-metal (MIM) electrode unit with two metal electrodes separated by a dielectric layer may be utilized as a nanogap sensor. Primers for amplifying a target polynucleotide strand may be immobilized on the surface of the dielectric layer. Polymerases, nucleotides, templates and primers may be added to the sample. At least one type of nucleotide may be labeled with a redox label that may enhance electron transport through the nanogap via tunneling and/or diffusion-based redox cycles. Signals (e.g., voltage pulses) may be directed through each of the electrodes. Current values from each electrode may be measured to (Continued)

establish a baseline signal. Alterations in the baseline signal may indicate the presence of target polynucleotide strands. The time to detect an alteration in the baseline signal may facilitate quantification of target polynucleotide strands.

20 Claims, 16 Drawing Sheets

(56) References Cited

U.S. PATENT DOCUMENTS

| | | | |
|---|---|---|---|
| 2015/0060283 A1* | 3/2015 | Afzali-Ardakani | ........................... C12Q 1/6869 |
| | | | 204/601 |
| 2015/0275288 A1* | 10/2015 | Luan | .................... C12Q 1/6869 |
| | | | 204/601 |
| 2021/0062255 A1* | 3/2021 | Fomina | ................ G01N 27/307 |

OTHER PUBLICATIONS

Fuller, C.W. et al., "Molecular Electronics Sensors on a Scalable Semiconductor Chip: A Platform for Single-Molecule Measurement of Binding Kinetics and Enzyme Activity," Proceedings of the National Academy of Sciences Year: 2022, vol. 119, No. 5, pp. 1-12, DOI: 10.1073/pnas.2112812119.

Lee, H. et al., "Rapid and highly sensitive pathogen detection by real-time DNA monitoring using a nanogap impedimetric sensor with recombinase polymerase amplification," Biosensors and Bioelectronics, Year: 2021, vol. 179, No. 113042, pp. 1-6, DOI: 10.1016/j.bios.2021.113042.

Mahmoodi, S. R. et al., "Single-Step Label-Free Nanowell Immunoassay Accurately Quantifies Serum Stress Hormones within Minutes," Science Advances, Year: 2021, vol. 7, pp. 1-8.

Ohshiro, T. et al., "Single-Molecule Counting of Nucleotide by Electrophoresis with Nanochannel-Integrated Nano-Gap Devices," Micromachines, Year: 2020, vol. 11, No. 982 pp. 1-14, DOI: 10.3390/mi11110982.

Pang, P. et al., "Fixed-Gap Tunnel Junction for Reading DNA Nucleotides," ACS nano, Year: 2014, vol. 8, No. 12, pp. 11994-12003, DOI: 10.1021/nn505356g.

Zou, H. et al., DNA Sequencing Based on Electronic Tunneling in a Gold Nanogap: A First-Principles Study. Physical Chemistry Chemical Physics, Year: 2022, vol. 24, pp. 5748-5754, DOI: 10.1039/d1cp04910k.

* cited by examiner

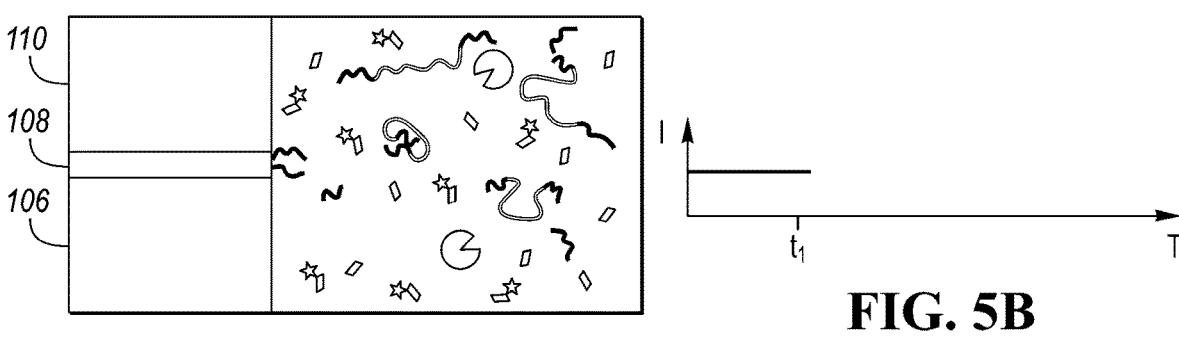
FIG. 5A
FIG. 5B
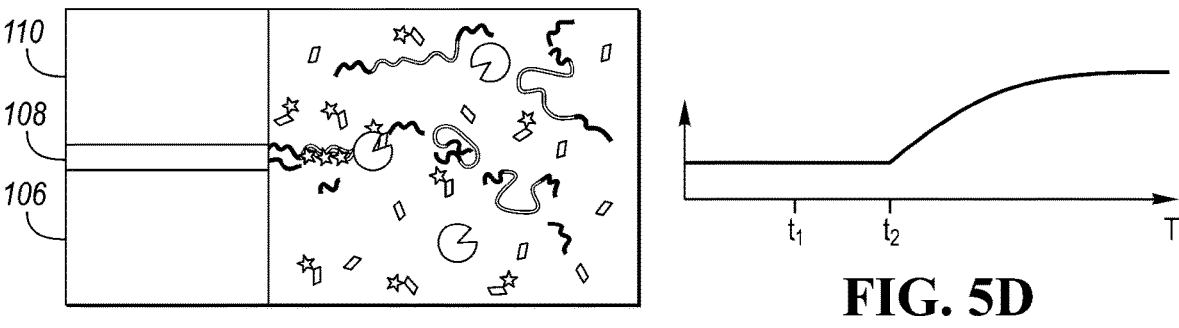
FIG. 5C
FIG. 5D
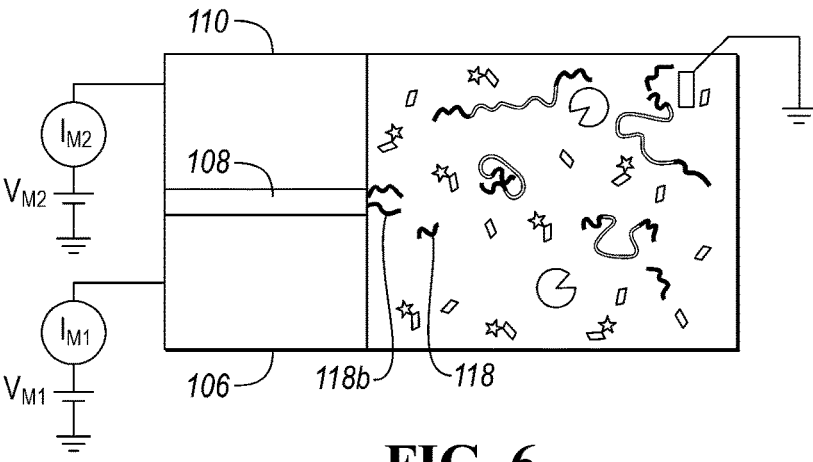
FIG. 6

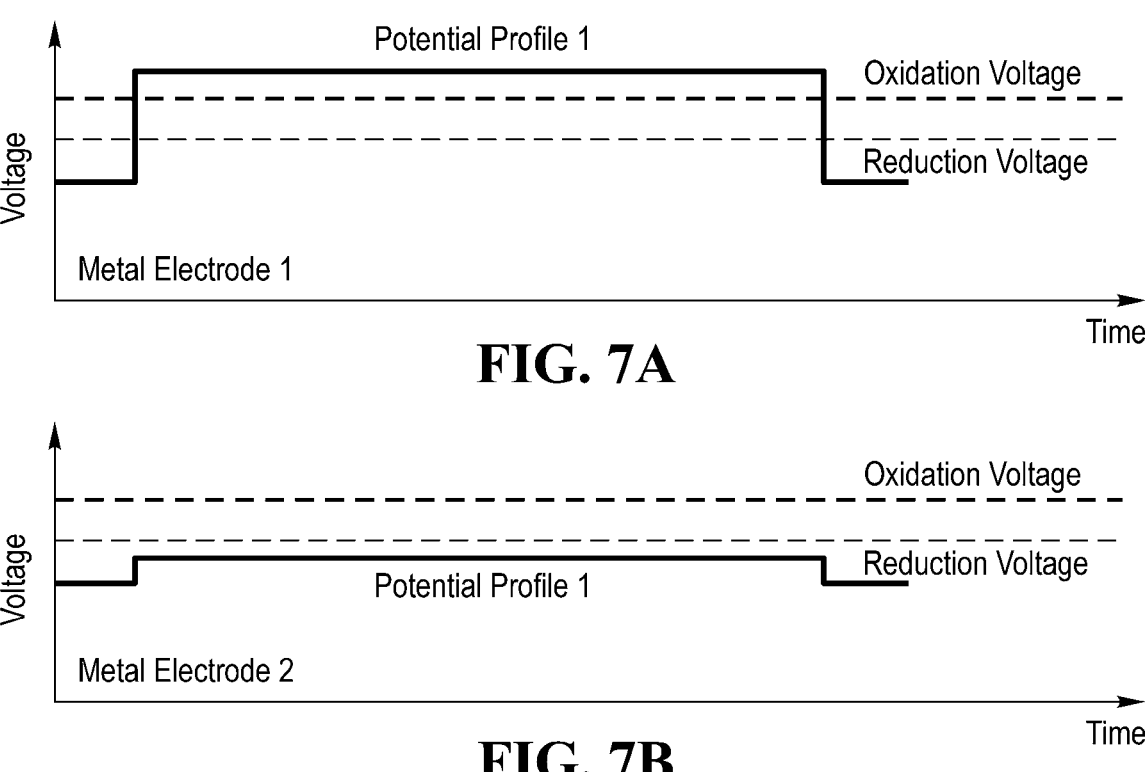
FIG. 7A
FIG. 7B
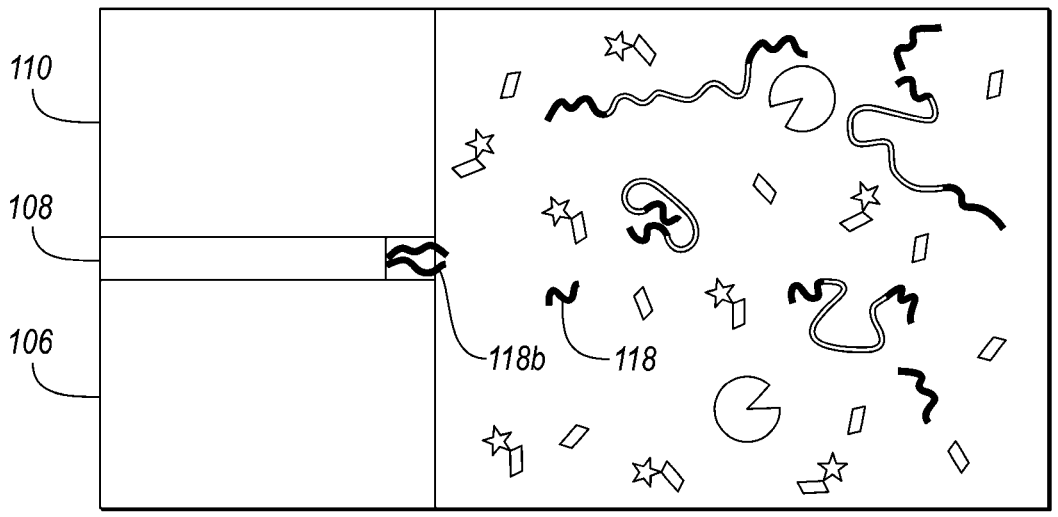
FIG. 8

NUCLEIC ACID DETECTION WITH A NANOGAP ELECTRICAL SENSOR

TECHNICAL FIELD

The present disclosure relates to systems, devices, and methods for detecting a polynucleotide strand in a sample.

BACKGROUND

Molecular diagnostic tools that rely on nucleic acid amplification technologies mainly use detection systems that are mostly dependent on cumbersome and expensive optical measurements. Nanogap-based electrical measurement of current via tunneling as well as the electrochemical redox process may present a faster and more cost-effective detection mechanism. Nanogap electrodes may measure increased tunneling current when a redox tag molecule reaches the effective sensing zone close to both electrodes. Additionally, redox tags that diffuse back and forth multiple times between two electrodes also induce redox current.

SUMMARY

In at least an aspect, a method for detecting a polynucleotide strand in a sample is provided. The method may comprise providing a device including a nanogap sensor comprising a first electrode and a second electrode separated by a dielectric layer, wherein a primer is attached to a surface of the dielectric layer. The method may additionally comprise providing a sample to the device, wherein the sample is a solution that includes a primer, a polymerase, a target polynucleotide strand, and at least one nucleotide modified with a redox tag. The method may further comprise delivering a first signal to the first electrode to generate a first current value; delivering a second signal to the second electrode to generate a second current value; measuring the first and second current values to determine a baseline signal; and measuring an alteration in the baseline signal to detect the presence of the target polynucleotide strands.

In another aspect, a method for detecting a polynucleotide strand in a sample is provided. The method may comprise providing a device including a nanogap sensor comprising a first electrode, a dielectric layer disposed on the first electrode, and a second electrode disposed on the dielectric layer to form an electrode stack, wherein the electrode stack includes a well compartment sized to receive a sample solution, and wherein the dielectric layer includes a nanocavity in which primers are attached. The method may additionally comprise providing the sample solution to the device, wherein the sample solution includes a primer, a polymerase, a target polynucleotide strand, and at least one nucleotide modified with a redox tag. The method may further comprise delivering a first signal to the first electrode to generate a first current value and a second signal to the second electrode to generate a second current value; measuring the first and second current values to determine a baseline signal; and measuring an alteration in the baseline signal to detect the presence of the target polynucleotide strands.

In yet another aspect, a system for detecting a polynucleotide strand in a sample is provided. The system may comprise a device including a nanogap sensor comprising a first electrode, a dielectric layer disposed on the first electrode, and a second electrode disposed on the dielectric layer to form an electrode stack, wherein the electrode stack includes a well compartment sized to receive a sample solution, wherein the sample solution includes a primer, a polymerase, a target polynucleotide strand, and at least one nucleotide modified with a redox tag, and wherein a primer is attached to the dielectric layer in fluid communication with the sample solution. The system may further comprise a controller configured to deliver a first signal to the first electrode to generate a first current value and a second signal to the second electrode to generate a second current value when the sample solution is in the device; measure the first and second current values to determine a baseline signal; and measure an alteration in the baseline signal to detect the presence of the target polynucleotide strands.

BRIEF DESCRIPTION OF THE DRAWINGS

FIGS. 5A-5D illustrate schematic views of a signal detection scenario for a sample solution having a high concentration of target polynucleotide strands according to an embodiment.

FIG. 6 illustrates a schematic view of an electrical measurement configuration according to an embodiment.

FIGS. 7A and 7B illustrate examples of voltage profiles applied to both the first electrode and the second electrode according to at least an embodiment.

FIG. 8 illustrates a schematic view of a nanogap undercut between the first and second electrodes.

Figures 16A, 16B, 16C:
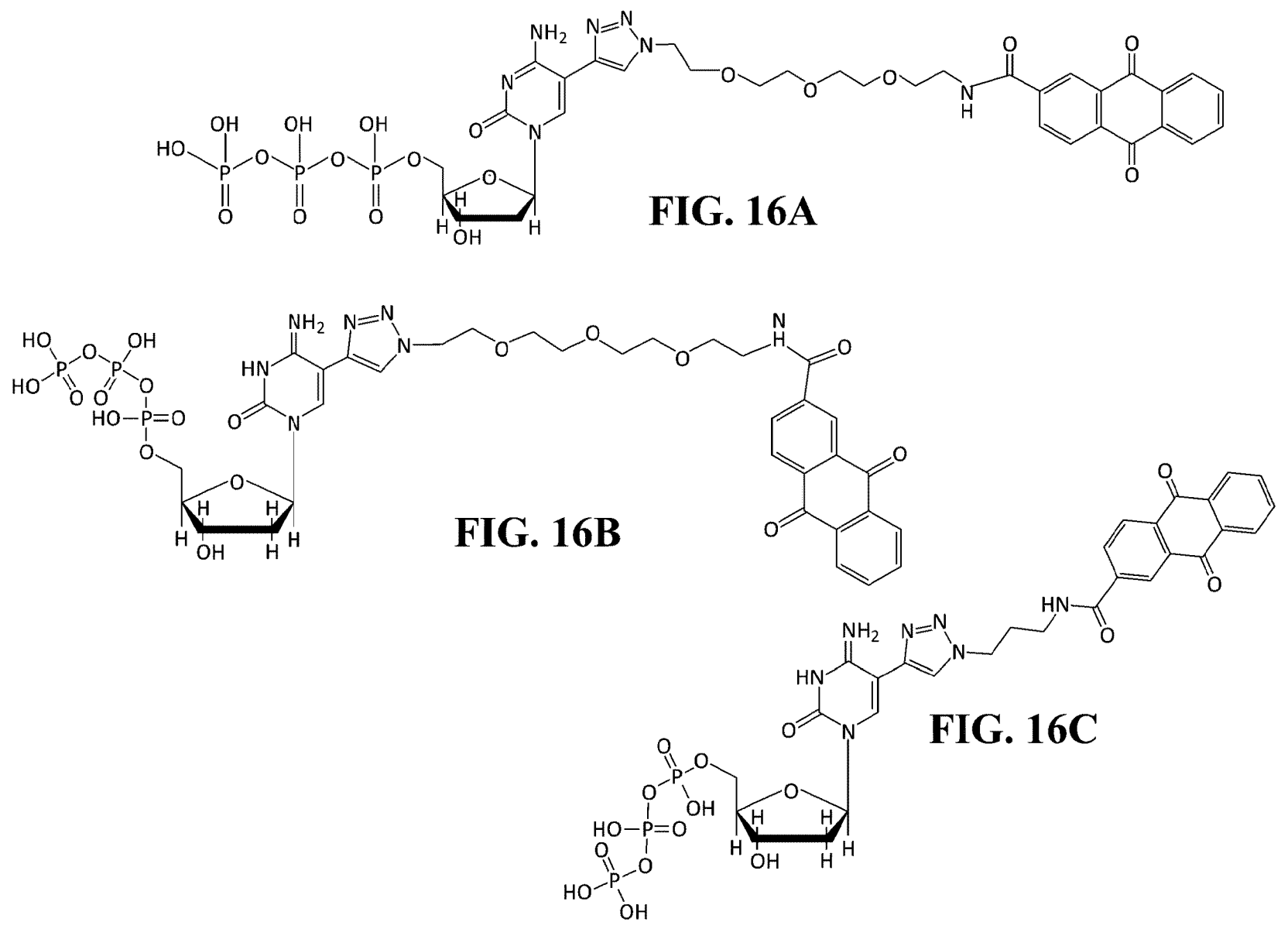

FIGS. 16A-16C illustrate examples of suitable modified dNTPs (labeled with anthraquinone redox labels) that may be enzymatically incorporated into a polynucleotide strand.

Figures 17A, 17B:
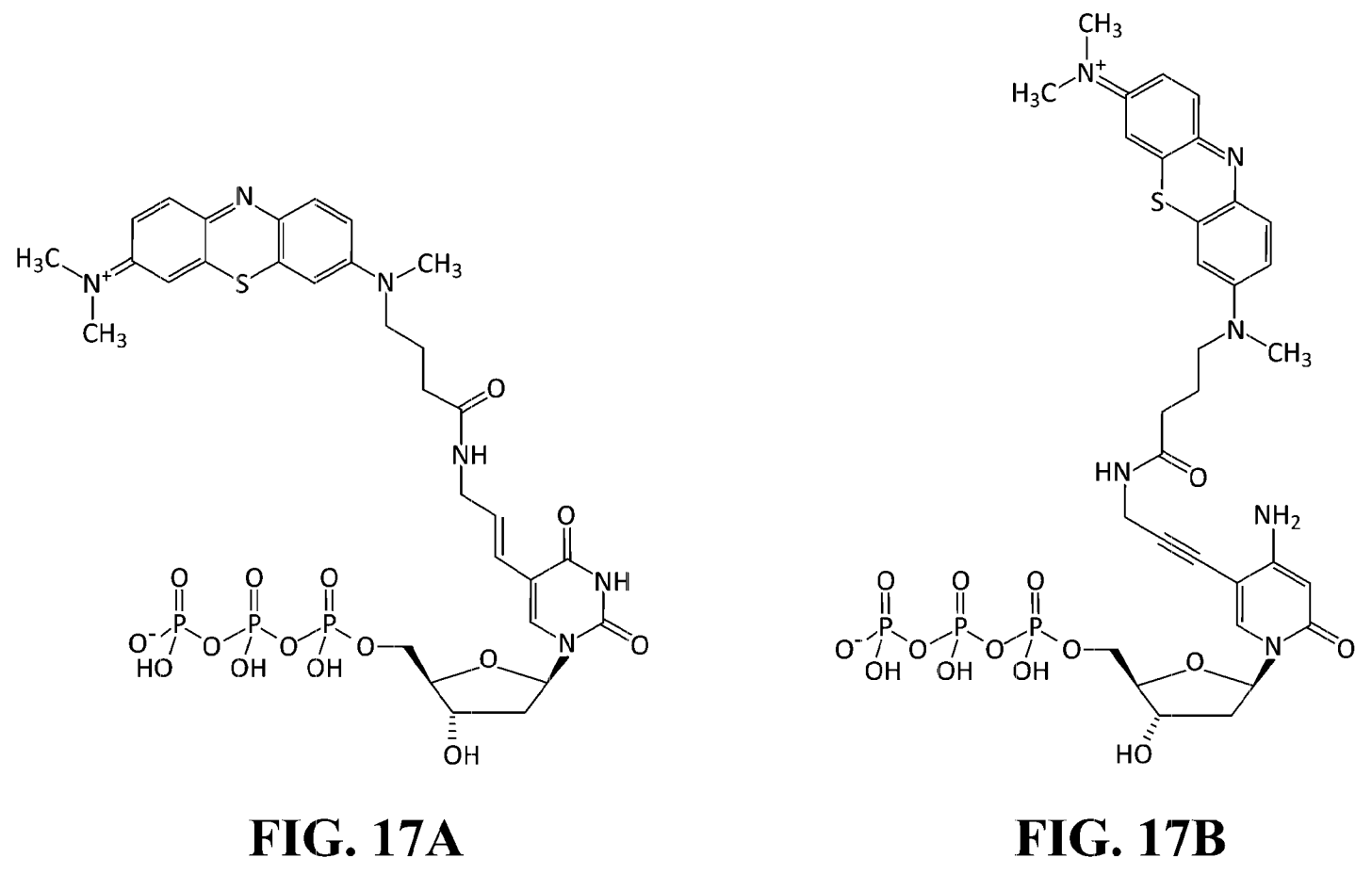

FIGS. 17A-17B illustrate examples of suitable modified dNTPs (labeled with methylene blue redox labels) that may be enzymatically incorporated into a polynucleotide strand.

Figures 18A, 18B, 18C:
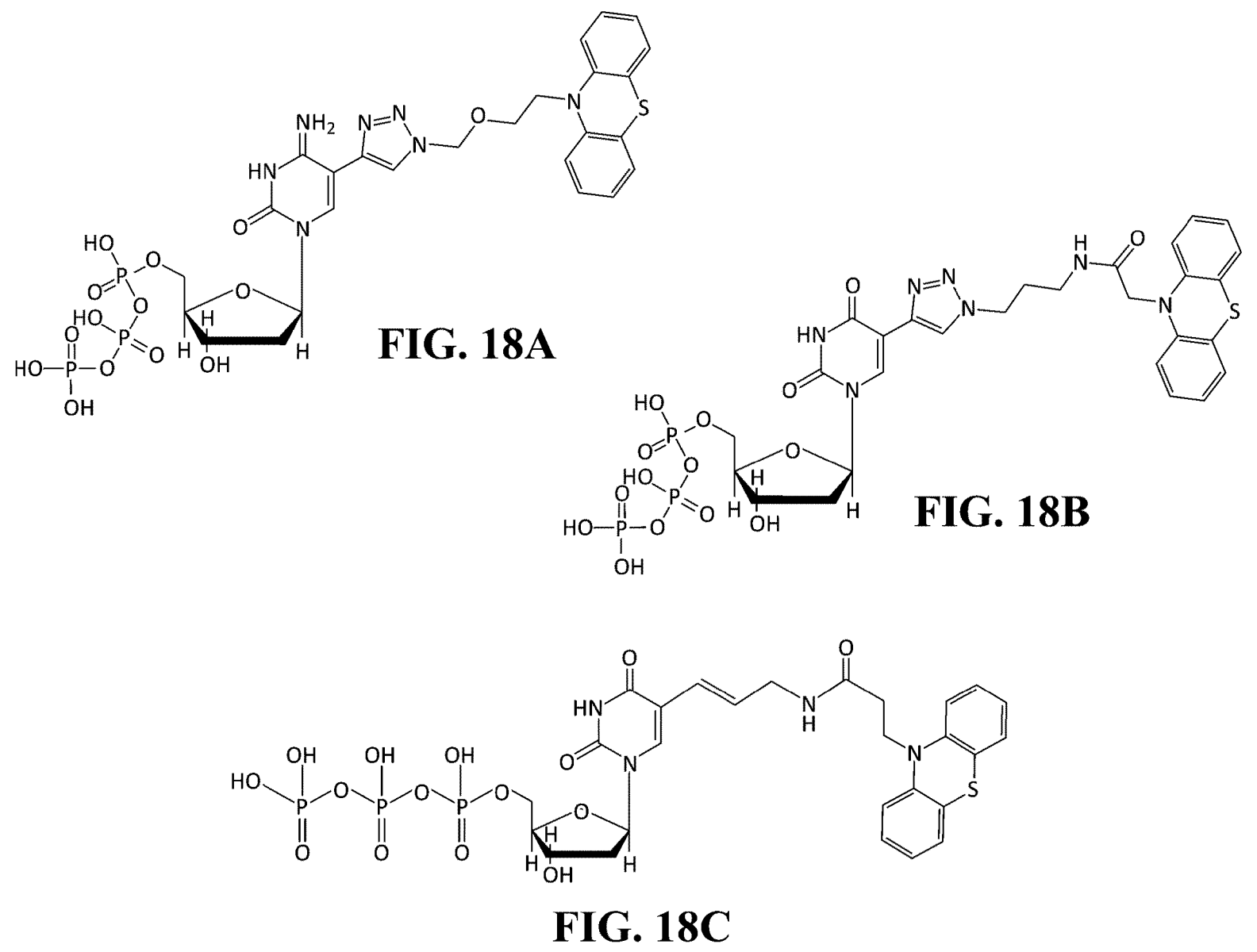

FIGS. 18A-18C illustrate examples of suitable modified dNTPs (labeled with phenothiazine redox labels) that may be enzymatically incorporated into a polynucleotide strand.

DETAILED DESCRIPTION

Figure 1A:
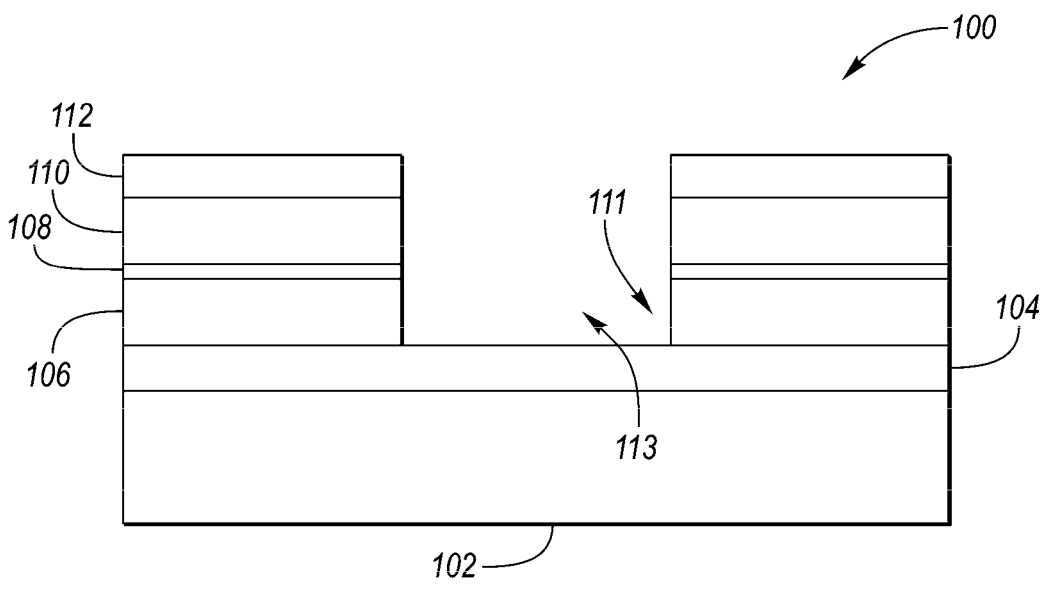
FIGS. 1A and 1B illustrate a schematic, side view and a schematic, top view, respectively, of a metal-insulator-metal electrode device with a nanogap according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about". The first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

Unless indicated otherwise, all technical and scientific terms used herein have the same meaning as commonly understood by one of ordinary skill in the art to which the present disclosure belongs.

It is also to be understood that this disclosure is not limited to the specific embodiments and methods described below, as specific components and/or conditions may, of course, vary. Furthermore, the terminology used herein is used only for describing particular embodiments and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The terms "or" and "and" can be used interchangeably and can be understood to mean "and/or".

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. When one of these three terms is used, the presently disclosed and claimed subject matter can include the use of either of the other two terms.

The terms "polynucleotide", "nucleotide", "nucleotide sequence", "nucleic acid" and "oligonucleotide" may be used interchangeably in this disclosure. They may refer to a polymeric form of nucleotides of any length, either deoxyribonucleotides or ribonucleotides, or analogs thereof. Polynucleotides may have any three-dimensional structure, and may perform any function, known or unknown. The following are non-limiting examples of polynucleotides: single-, double-, or multi-stranded DNA or RNA, genomic DNA, cDNA, DNA-RNA hybrids, or a polymer comprising purine and pyrimidine bases or other natural, chemically or biochemically modified, non-natural, or derivatized nucleotide bases. The terms "polynucleotide" and "nucleic acid" should be understood to include, as applicable to the embodiment being described, single-stranded (such as sense or antisense) and double-stranded polynucleotides. A polynucleotide may comprise one or more modified nucleotides, such as methylated nucleotides and nucleotide analogs. If present, modifications to the nucleotide structure may be imparted before or after assembly of the polymer. The sequence of nucleotides may be interrupted by non-nucleotide components. A polynucleotide may be further modified after polymerization, such as by conjugation with a labeling component.

The terms "complementarity" or "complement" refers to the ability of a nucleic acid to form hydrogen bond(s) with another nucleic acid sequence by either traditional Watson-Crick or other non-traditional types. A percent complementarity indicates the percentage of residues in a nucleic acid molecule which can form hydrogen bonds (e.g., Watson-Crick base pairing) with a second nucleic acid sequence (e.g., 4, 5, and 6 out of 6 being 66.67%, 83.33%, and 100% complementary). "Perfectly complementary" may refer to all the contiguous residues of a nucleic acid sequence may hydrogen bond with the same number of contiguous residues in a second nucleic acid sequence. "Substantially complementary" as used herein may refer to a degree of complementarity that is at least 40%, 50%, 60%, 62.5%, 70%, 75%, 80%, 85%, 90%, 95%, 97%, 98%, 99%, or 100%, or percentages in between over a region of 4, 5, 6, 7, and 8 nucleotides, or refers to two nucleic acids that hybridize under stringent conditions.

The term "enzyme" or "polymerase" as used herein may refer to any peptide, oligopeptide, polypeptide, gene product, expression product, or protein capable of translocating a polynucleotide strand. Non-limiting examples of proteins capable of translocating a polynucleotide strand include DNA polymerase, RNA polymerase, ribosome, a single-stranded binding protein, topoisomerase, helicase, nuclease, exonuclease, endonuclease, a zinc finger nuclease, an RNA guided DNA endonuclease, a transcription activator-like effector nuclease, a CRISPR protein, and combinations thereof.

Unless expressly stated to the contrary, all R groups (e.g. $R_i$ where i is an integer) include hydrogen, alkyl, lower alkyl, $C_{1-6}$ alkyl, $C_{6-10}$ aryl, $C_{6-10}$ heteroaryl, $-NO_2$, $-NH_2$, $-N(R'R'')_2$, $-N(R'R''R''')_3{}^+L^-$, Cl, F, Br, $-CF_3$, $-CCl_3$, $-CN$, $-SO_3H$, $-PO_3H_2$, $-COOH$, $-CO_2R'$, $-COR'$, $-CHO$, $-OH$, $-OR'$, $-O^-M^+$, $-SO_3{}^-M^+$, —$PO_3^-M^+$, —$COO^-M^+$, —$CF_2H$, —$CF_2R'$, —$CFH_2$, and —$CFR'R''$ where R', R'' and R''' are $C_{1-10}$ alkyl or $C_{6-18}$ aryl groups; single letters (e.g., "n" or "o") are 1, 2, 3, 4, or 5; in the compounds disclosed herein a CH bond can be substituted with alkyl, lower alkyl, $C_{1-6}$ alkyl, $C_{6-10}$ aryl, $C_{6-10}$ heteroaryl, —$NO_2$, —$NH_2$, —$N(R'R'')_2$, —$N(R'R''R''')_3^+L^-$, Cl, F, Br, —$CF_3$, —$CCl_3$, —CN, —$SO_3H$, —$PO_3H_2$, —COOH, —$CO_2R'$, —COR', —CHO, —OH, —OR', —$O^-M^+$, —$SO_3^-M^+$, —$PO_3^-M^+$, —$COO^-M^+$, —$CF_2H$, —$CF_2R'$, —$CFH_2$, and —$CFR'R''$ where R', R'' and R''' are $C_{1-10}$ alkyl or $C_{6-18}$ aryl groups; the indication of a moiety or structure with positive charges implies that one or more negative counter ions are present to balance the charge, similarly, the indication of a moiety or structure with negative charges implies that one or more positive counter ions are present to balance the charge; percent, "parts of," and ratio values are by weight; the term "polymer" includes "oligomer," "copolymer," "terpolymer," and the like; molecular weights provided for any polymers may refer to weight average molecular weight unless otherwise indicated; the description of a group or class of materials as suitable for a given purpose in connection with one or more embodiments may imply that mixtures of any two or more of the members of the group or class are equally suitable; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

The term "alkyl" as used herein may mean $C_{1-20}$, linear, branched, rings, saturated or at least partially and in some cases fully unsaturated (i.e., alkenyl and alkynyl) hydrocarbon chains, including for example, methyl, ethyl, propyl, isopropyl, butyl, isobutyl, tert-butyl, pentyl, hexyl, octyl, ethenyl, propenyl, butenyl, pentenyl, hexenyl, octenyl, butadienyl, propynyl, butynyl, pentynyl, hexynyl, heptynyl, and allenyl groups. "Lower alkyl" refers to an alkyl group having 1 to about 8 carbon atoms (i.e., a $C_{1-8}$ alkyl), e.g., 1, 2, 3, 4, 5, 6, 7, or 8 carbon atoms. Lower alkyl may also refer to a range between any two numbers of carbon atoms listed above. "Higher alkyl" refers to an alkyl group having about 10 to about 20 carbon atoms, e.g., 10, 11, 12, 13, 14, 15, 16, 17, 18, 19, or 20 carbon atoms. Higher alkyl may also refer to a range between any two number of carbon atoms listed above.

The term "aryl" as used herein may mean an aromatic substituent that can be a single aromatic ring, or multiple aromatic rings that are fused together, linked covalently, or linked to a common group, such as, but not limited to, a methylene or ethylene moiety. The common linking group also can be a carbonyl, as in benzophenone, or oxygen, as in diphenylether. Examples of aryl include, but are not limited to, phenyl, naphthyl, biphenyl, and diphenylether, and the like. Aryl groups include heteroaryl groups, wherein the aromatic ring or rings include a heteroatom (e.g., N, O, S, or Se). Exemplary heteroaryl groups include, but are not limited to, furanyl, pyridyl, pyrimidinyl, imidazoyl, benzimidazolyl, benzofuranyl, benzothiophenyl, quinolinyl, isoquinolinyl, thiophenyl, and the like. The aryl group may be optionally substituted (a "substituted aryl") with one or more aryl group substituents, which can be the same or different, wherein "aryl group substituent" includes alkyl (saturated or unsaturated), substituted alkyl (e.g., haloalkyl and perhaloalkyl, such as but not limited to —$CF_3$), 9ycloalkyl, aryl, substituted aryl, aralkyl, halo, nitro, hydroxyl, acyl, carboxyl, alkoxyl (e.g., methoxy), aryloxyl, aralkyloxyl, thioalkyl, thioaryl, thioaralkyl, amino (e.g., aminoalkyl, aminodialkyl, aminoaryl, etc.), sulfonyl, and sulfinyl.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. In the specific examples set forth herein, concentrations, temperature, and reaction conditions (e.g., pressure, pH, etc.) can be practiced with plus or minus 50 percent of the values indicated rounded to three significant figures. In a refinement, concentrations, temperature, and reaction conditions (e.g., pressure, pH, etc.) can be practiced with plus or minus 30 percent of the values indicated rounded to three significant figures of the value provided in the examples. In another refinement, concentrations, temperature, and reaction conditions (e.g., pH, etc.) can be practiced with plus or minus 10 percent of the values indicated rounded to three significant figures of the value provided in the examples.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

In this application, electroactive molecules include Redox molecules, a Redox signal includes electrical signals such as a change in baseline current that may be visualized in the form of spikes or fluctuations for example. Polynucleic acid (NA), or polynucleotide strand includes DNA, and nucleotides include dNTPs.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms. The processes, methods, or algorithms can also be implemented in an executable software object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components.

Throughout this application, where publications are referenced, the disclosures of these publications in their entireties are hereby incorporated by reference into this application to more fully describe the state of the art to which this invention pertains.

The term molecular diagnostics encompasses a class of tests that identify biological markers. For example, molecular diagnostic tests may identify genetic DNA mutations that give rise to disease. Molecular diagnostics may also identify the presence of DNA, RNA, or proteins in a sample such as a human blood sample for the purposes of diagnosing conditions including, but not limited to, diseases, allergies, or autoimmune conditions.

Molecular diagnostics are receiving an increased amount of mainstream attention given their usefulness in aiding the fight against highly contagious diseases such as SARS-Cov-2. In addition to identifying viral RNA in human samples to diagnose and map infections, molecular diagnostic tests have been influential in tracing the lineage of diseases such as SARS-Cov-2 by identifying changes in the viral RNA sequence. Such diseases have therefore greatly increased the demand for rapid tests that may be performed on-site and may handle a large volume of test samples with high sensitivity and selectivity at a reasonable cost. Thus, there is a need for technological advances over currently available solutions.

Various molecular diagnostic applications have utilized electrical detection using a nanogap-based structure. This type of system may be very sensitive to changes within or in proximity to the nanogap, which renders it highly useful for real-world detection situations. The high sensitivity conferred by such a system may allow for the detection of biomolecules that are present in lower concentrations in a sample. In this way, diagnosis of diseases or conditions may be achieved earlier after infection or onset. Additionally, the electrical detection mechanism does not require a bulky system such as the systems typically used for optics-based detection. The high sensitivity that can be achieved by a nanogap-based sensor also greatly reduces the time it takes to complete a test. Thus, faster detection is possible with simpler hardware giving rise to the potential for a portable, high throughput measurement system. Together, these benefits confer a benefit for point-of-care applications.

Many molecular diagnostic tools such as those aimed at identifying patients infected with diseases such as SARS-Cov-2, for example, rely on nucleic acid amplification technologies. While nucleic acid amplification technologies such as Transcription Mediated Amplification (TMA), Loop-mediated Isothermal Amplification (LAMP), Helicase Dependent Amplification (HAD), and Recombinase Polymerase Amplification (RPA) are improvements over previous technologies given that they provide reduced amplification time, their detection is still mostly dependent on optical measurements which are cumbersome and expensive.

Nanogap-based electrical measurement of current via tunneling as well as the electrochemical redox process may present a faster and more cost-effective detection mechanism. First, a nanogap electrode measures increased tunneling current when a redox tag molecule reaches the effective sensing zone close to both electrodes. Second, redox tags that diffuse back and forth multiple times between two electrodes also induce redox current. There is a need for systems that may be effectively used at points of care to rapidly and accurately identify nucleic acids of interest in patient samples in a cost-effective manner.

In one or more embodiments, systems and methods are provided herein for detecting nucleic acids during the early stage of amplification cycles. The systems and methods described herein may sense nucleic acid target molecules in the solution phase during early stages of the amplification by measuring current change with an electrode pair and a nanogap dielectric material in-between. According to various embodiments, a metal-insulator-metal (MIM) electrode unit, where a first metal electrode is separated from a second metal electrode by a nanogap dielectric, may be utilized as a sensor. Primers for the nucleic acid amplification may be immobilized on the surface of the thin dielectric nanogap material. For the amplification, polymerase enzymes, dNTPs, templates and primers may be added to the sample solution and at least one type of nucleotide may be labeled with a redox tag that may enhance electron transport through the nanogap via either tunneling or diffusion-based redox cycles. Amplified nucleic acids containing nucleotides modified with redox tags may bind to the immobilized primers on the nanogap. The presence of the redox tags may induce changes in electron transfer between the first and second electrodes which may be detectable in the form of spikes, baseline current changes or fluctuations, etc. Changes in electron transfer may similarly be detected when templates bind to immobilized primers and nucleotides modified with redox tags are incorporated into the nucleic acid copy by the polymerase enzyme. Since the presence of even a single molecule may introduce current change with a nano-confined structure, the detection may occur during the early stage of amplification, which may reduce detection time in biosensing applications.

Figure 1B:
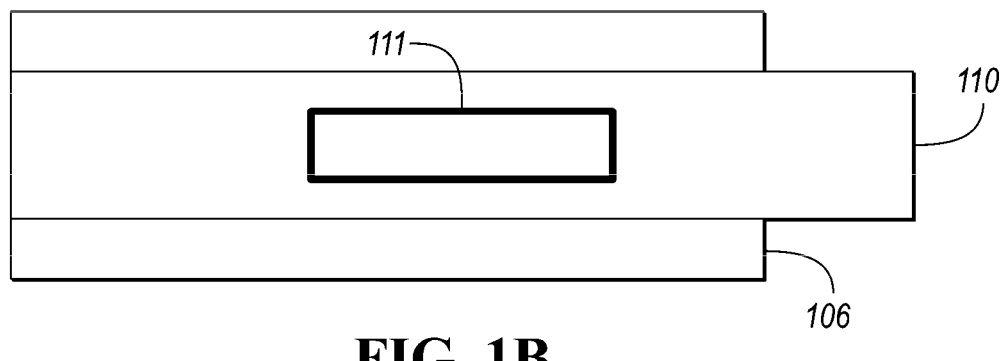

FIG. 1A illustrates a schematic of a side view of a nanogap electrode sensor device "device" 100 according to an embodiment. The device 100 may include a substrate 102 and a dielectric bottom 104 at least partially disposed on the substrate 102. The device 100 may additionally include a first electrode 106 at least partially disposed on the dielectric bottom 104. The device may additionally include a dielectric layer 108 at least partially disposed on the first electrode 106. The dielectric layer may also be referred to as a nanogap or a gap dielectric. A second electrode 110 may be at least partially disposed on the dielectric layer 108. A dielectric cap 112 may be at least partially disposed on the second electrode. An active sensing zone 111 may be formed by etching the electrode-stack in the form of a window. The sensing zone may be positioned along the perimeter of the window. As shown in FIG. 1, a rectangular window shape is shown. It is recognized that the shape of the window etched into the electrode stack may be any shape and that the shape may be chosen for particular effects that it may have on the steps of the method as described herein. Since the window opening may serve as a well compartment 113 for the reaction of reagents, the shape of the window may affect parameters including but not limited to filling, washing, and flowing solution. Depending on the properties of the surface and the sample solution composition, the design may be optimized to avoid issues such as bubble trapping or cross-talk with neighboring wells (in the case of multiplexing for example).

The format of the electrodes may be flexible provided that the distance between them is set precisely. The electrodes and the nanogap may be formed from materials that are stable in the test solution under multiple rounds of electrochemical measurements and that are compatible with the surface modification used to immobilize the primers. Electrode materials may include, but are not limited to, platinum, gold, titanium nitride, and palladium or conductive graphene. Dielectric materials may include, but are not limited to, ceramics including hafnium and zirconium silicates, metal oxides or nitrides, such as aluminum oxide, titanium dioxide, hafnium oxide, zirconium oxide, silicon oxide, silicon nitride, and hexagonal boron nitride or dielectric graphene. The thickness of the nanogap dielectric may be less than 20 nm.

Figure 2:
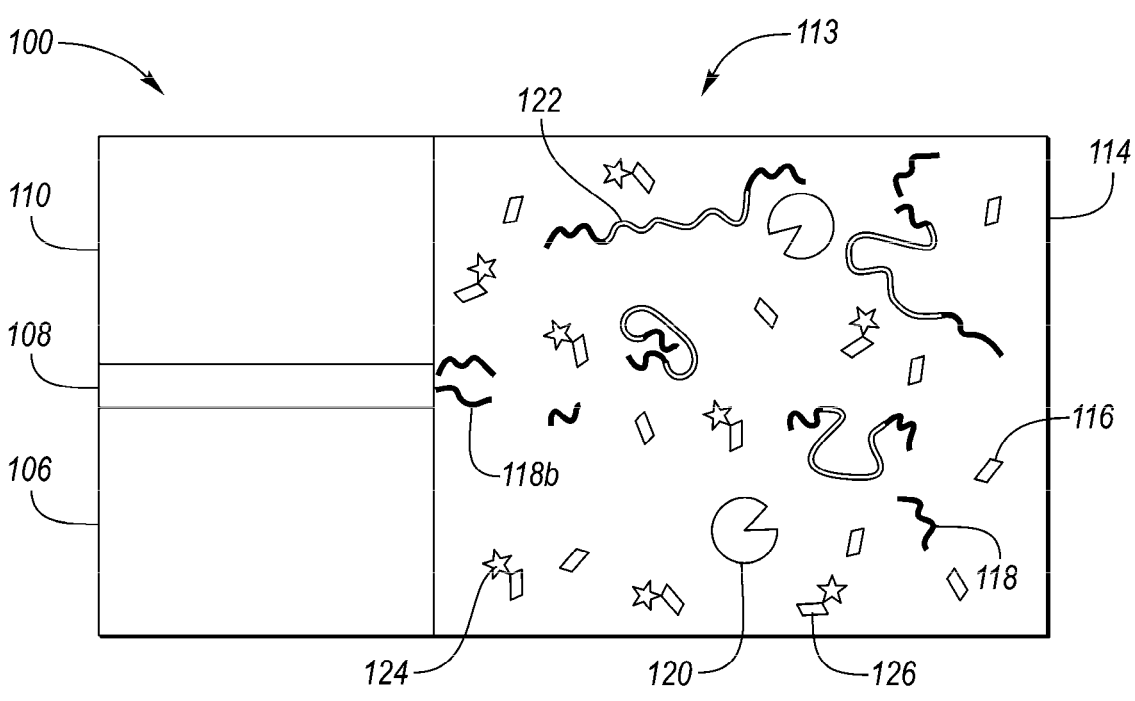
FIG. 2 illustrates a schematic view of a sample solution composition along with a structure of a metal-insulator-metal electrode according to an embodiment.

FIG. 2 illustrates a device 100 exposed to a sample solution 114 according to an embodiment. The sample solution 114 may include nucleotides, also referred to as dNTPs 116, primers 118, an enzyme 120, and a target polynucleotide strand 122. The sample solution 114 may also include buffers and salts. The sample solution may be referred to as "sample solution" or "bulk solution" interchangeably. The enzyme 120 may be a polymerase capable of incorporating dNTPs into a polynucleotide strand. In some embodiments, the primers 118 may float freely in the sample solution 114. The primers 118b may also be immobilized to a surface of the gap dielectric 108. In at least some embodiments, some of the primers 118 may float freely in the sample solution and other primers 118b may be immobilized to a surface of the gap dielectric 108. In this way, amplification of the target polynucleotide strands 122 may occur in the bulk solution 114 as well as on the surface of the gap dielectric 108 concurrently. For example, target polynucleotide strands 122 floating in the bulk solution 114 may bind to the primers 118 floating in the bulk solution 114 and an amplification of the bound target polynucleotide strand 122 may occur. Concurrently, other of the target polynucleotide strands 122 floating in the bulk solution may bind to the primers 118b attached to the dielectric layer 108 and the bound target polynucleotide strand 122 may be amplified on the surface of the dielectric layer 108. The target polynucleotide strand 122 that binds to the primers 118b attached to the dielectric layer 108 may or may not contain dNTPs modified with a redox label. The same sample solution 114 with primers 118, polymerases 120, target polynucleotide strands 122, and dNTPs 116 (at least one type of dNTPs is modified with a redox tag) may remain in the well compartment 113 of the device during the amplification and detection of the target polynucleotide strands.

At least one type of dNTP e.g., dATP, dCTP, dGTP, dTTP/dUTP) in the sample solution 114 may be modified with a redox tag 124 to form a redox labeled dNTP 126. Non-limiting examples of redox molecules that may be used as redox tags 124 include ferrocene and its derivatives, osmium and ruthenium complexes, tetrathiafulvalene, methylene blue, anthraquinone, phenothiazine, aminophenol, nitrophenol, erythrosine B, ATTO MB2, etc.

The redox tags 124 on the redox labeled dNTPs 126 may have similar electrochemical behavior when floating freely in the sample solution 114 versus when incorporated into an amplified polynucleotide strand. If a redox tag 124 is in its reduced form initially, for example, a redox-labeled dNTP 126 may first interact with the oxidation electrode where the redox tag 124 may be oxidized. Oxidation current may then be measured through the electrode. Some of the dNTPs with oxidized redox tags 124 may reach the other electrode by diffusion and the redox tag 124 may then be reduced back. This reduction reaction may induce a redox current to the second electrode. A redox tag 124 may initially be in its oxidized form. In this case, the opposite configuration may be utilized where the oxidized redox tag 124 is first reduced. Currents measured from redox tags 124 being oxidized and reduced may form a pre-amplification baseline.

Figure 3:
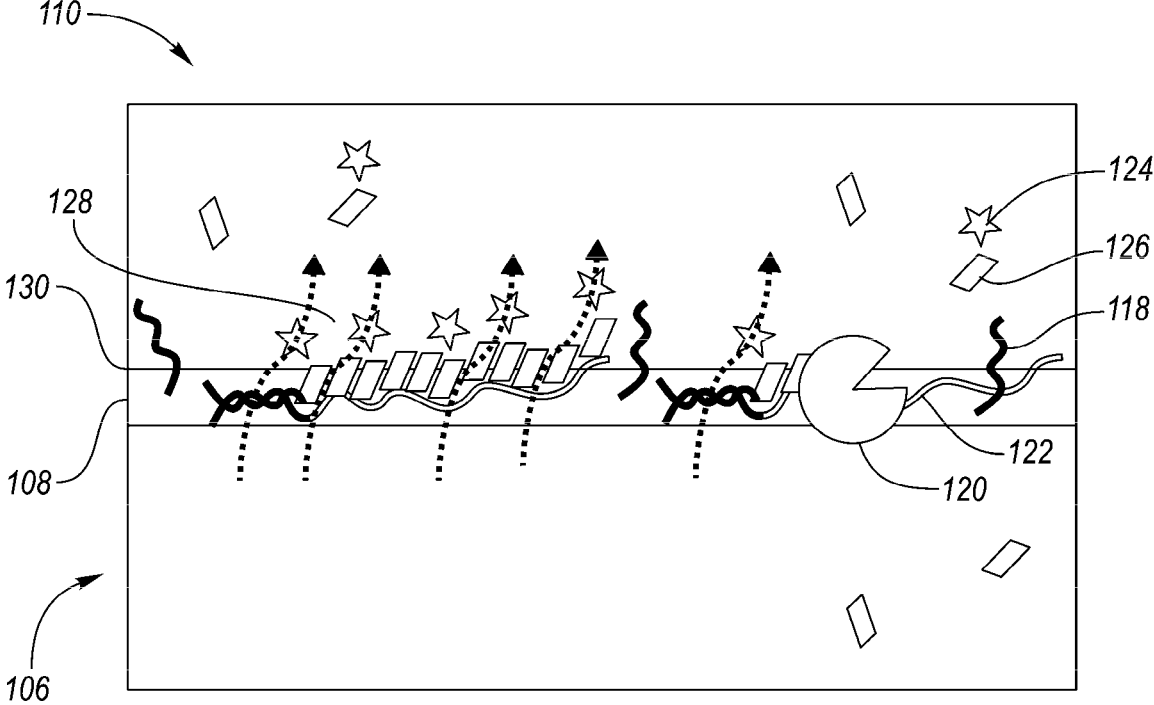
FIG. 3 illustrates a schematic view of signaling mechanisms used to detect a target polynucleotide strand according to at least some embodiments.
Figures 4A, 4B, 4C, 4D, 4E, 4F:
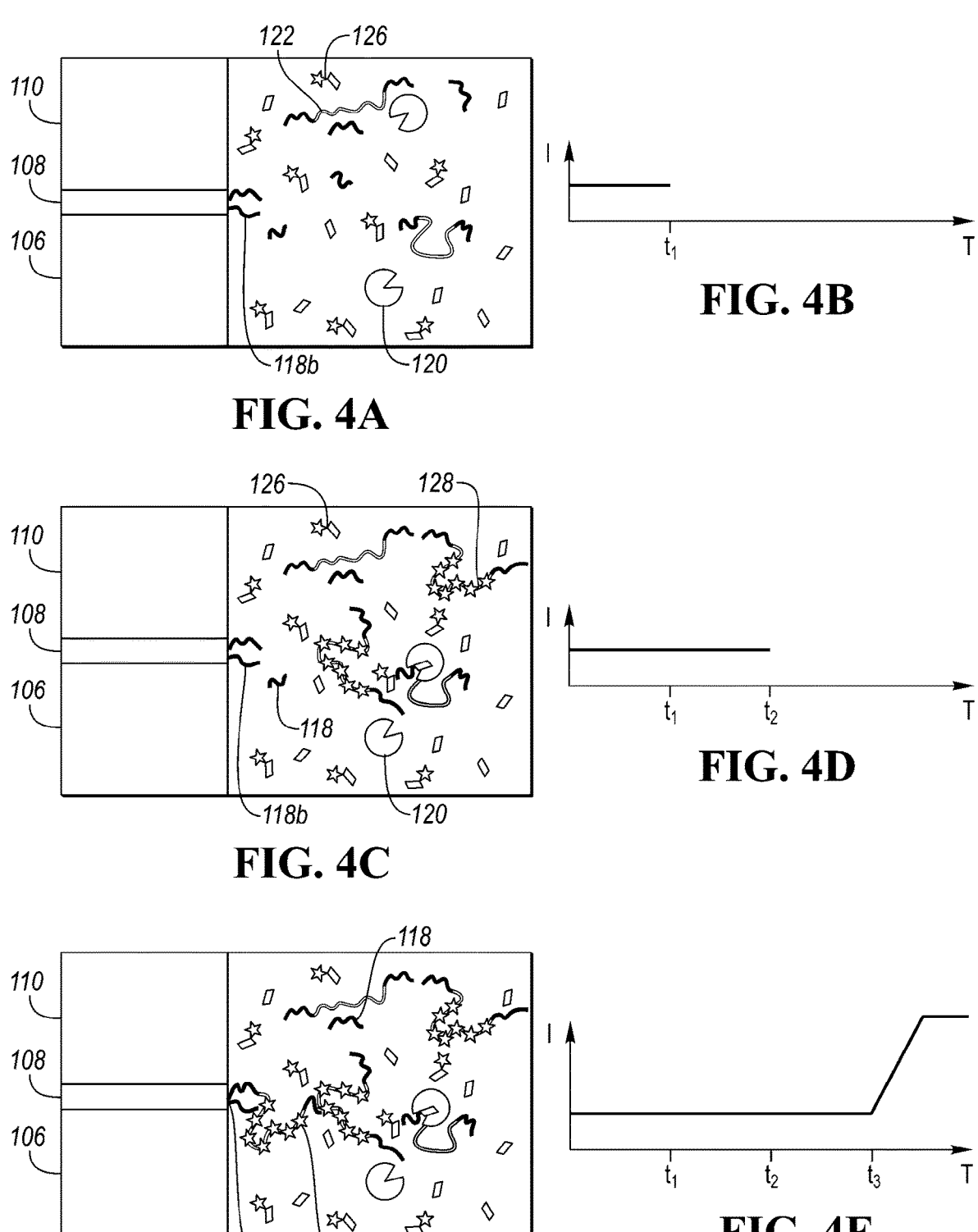
FIGS. 4A-4F illustrate schematic views of a signal detection scenario for a sample solution having a low concentration of target polynucleotide strands according to an embodiment.

A signaling mechanism is depicted in FIG. 3. Nucleic acid amplification includes dNTPs being incorporated into polynucleotide strands by a polymerase enzyme. The reaction begins by the binding of a primer and a template (or target) polynucleotide strand. The polymerase enzyme then incorporates dNTPs according to the template or target sequence to synthesize a copy of the target polynucleotide strand. Once the nucleic acid amplification reaction begins in the sample solution 114, signaling may occur via two different pathways simultaneously. Amplification may proceed in bulk solution. Amplification may also proceed on the nanogap dielectric material 108 because the sample solution 114 contains target polynucleotide strands 122, polymerases 120, primers 118 and dNTPs.

Depending on the specific requirement of a test, the amplification process may be further controlled by test conditions such as temperature, light, or pH. For example, polymerase enzymes may be inactivated and held in an inactivated state. Upon altering the temperature or pH of the sample solution 114, the polymerases 120 in the sample solution 114 may be induced to become active, thereby initiating the amplification reaction. Similarly, treatment with particular wavelengths of light may induce a polymerase to become active. In this way, treating the sample solution 114 with a particular wavelength of light capable of activating the polymerases 120 in the sample solution 114 may initiate the amplification reaction. As depicted in FIG. 3, amplified products in bulk solution 128 may have redox-modified bases 126 and may therefore contribute to the electrical signal output when the amplified products 128 diffuse to the proximity of the active sensing zone 130 or bind to the immobilized primers 118b in the nanogap 108. The active sensing zone 130 is defined by the space between metal electrode 106 and metal electrode 110 over the dielectric or nanogap 108. Alternatively, electrical current may also change when synthesis happens on the nanogap 108 with immobilized primers 118b and redox-modified nucleotides 126 are incorporated into the copy. The induced signal change in current, indicating the presence of the target molecules, may manifest as a form of increased baseline current, spikes, and fluctuations during the early stage of amplification. The time required to detect a change in the current signal change may enable the quantitation of the target molecules.

The principle behind the system may be illuminated via two extreme examples: low and high target concentration. FIGS. 4A through 4F illustrate detection of redox labeled nucleotides 126 in a sample where the target DNA 122 concentration is low. In this case, the probability of the target DNA 122 reaching the surface-bound primers 118 in the sensing zone 130 by diffusion is low. So, it may take more time to detect a signal change in current (See FIG. 4A). The time to detect a signal may be inversely proportional to the target concentration in the sample. To shorten the detection time, primers and polymerases may be added to the bulk solution 114. In that scenario, target DNA 122 may begin to amplify in the bulk solution 114 and the amplified DNA with redox labels 128 may become the major population (See FIG. 4C). The amplified DNA with redox labels 128 may eventually hybridize to the surface-bound primers 118 in the sensing zone 130 (See FIG. 4E). The sensor may detect the increased current caused by the redox labels within the amplified DNA. In this way, significant changes in current may be detected by the sensor when amplified DNA with redox labels 128 enters the sensing zone 130.

Where a sample includes high target DNA concentration 122 as illustrated in FIGS. 5A and 5B, the probability of a target DNA molecule 122 reaching the surface-bound primers by diffusion is high. In this case, redox labeled dNTPs 126 may be incorporated during synthesis by polymerase 120 and remain within the sensing zone 130 (See FIG. 5C), which may induce a detectable change in current at an early time point. Overall, simultaneously utilizing DNA amplification on the surface and DNA amplification in bulk followed by binding to the surface may result in faster detection of target DNA 122 in a sample regardless of target DNA concentration because the two methods may occur in parallel and complement each another.

FIG. 6 illustrates the configuration of the electrical measurement setup. Two metal electrodes may be controlled by two independent measurement electronics units that may apply distinct voltages while measuring current. For example, as depicted in FIG. 6, the first metal electrode 106 may apply voltage VM1 and measure current IM1. Similarly, the second metal electrode 110 may apply voltage VM2 and measure current IM2. A common reference electrode is used to ground the solution and provide a stable potential reference for the measurement.

Examples of the voltage profiles are described in FIGS. 7A and 7B. The voltage conditions for each electrode may be selected based on the redox potential of the redox tag molecules. As described in FIGS. 7A and 7B, one electrode may have a voltage that is higher than the oxidation potential of the redox tag. The other electrode may have a voltage lower than the redox potential of the redox tag. The voltage condition may be further adjusted to optimize the tunneling current.

In some embodiments, the MIM electrode unit may be processed further to improve the signal quality. As shown in FIG. 8, the gap dielectric may be selectively etched to expose additional electrode surface and to provide a nanocavity. This additional step may enhance the surface reactivity of the active sensing components such as the electrodes and the dielectric for example. The additional exposed electrode surface may also enhance the physical interactions between biomolecules and the sensor.

Figure 9A:
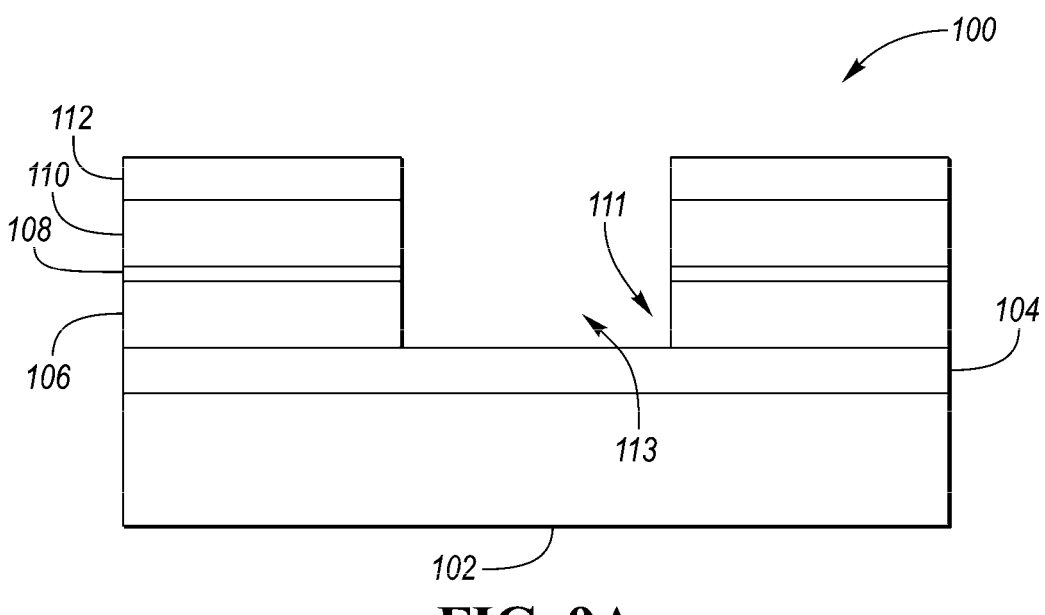
FIGS. 9A and 9B illustrate a schematic, side view and a schematic, top view, respectively, of an example of a potential nanogap sensing device design according to an embodiment.
Figure 9B:
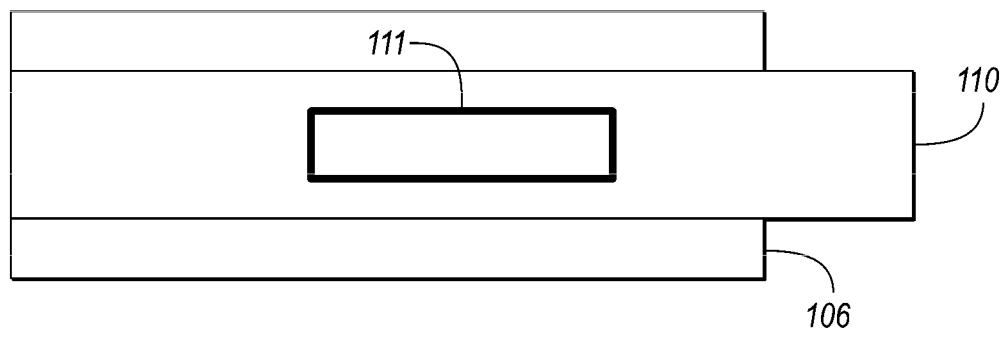
Figures 10A, 10B, 10C, 10D:
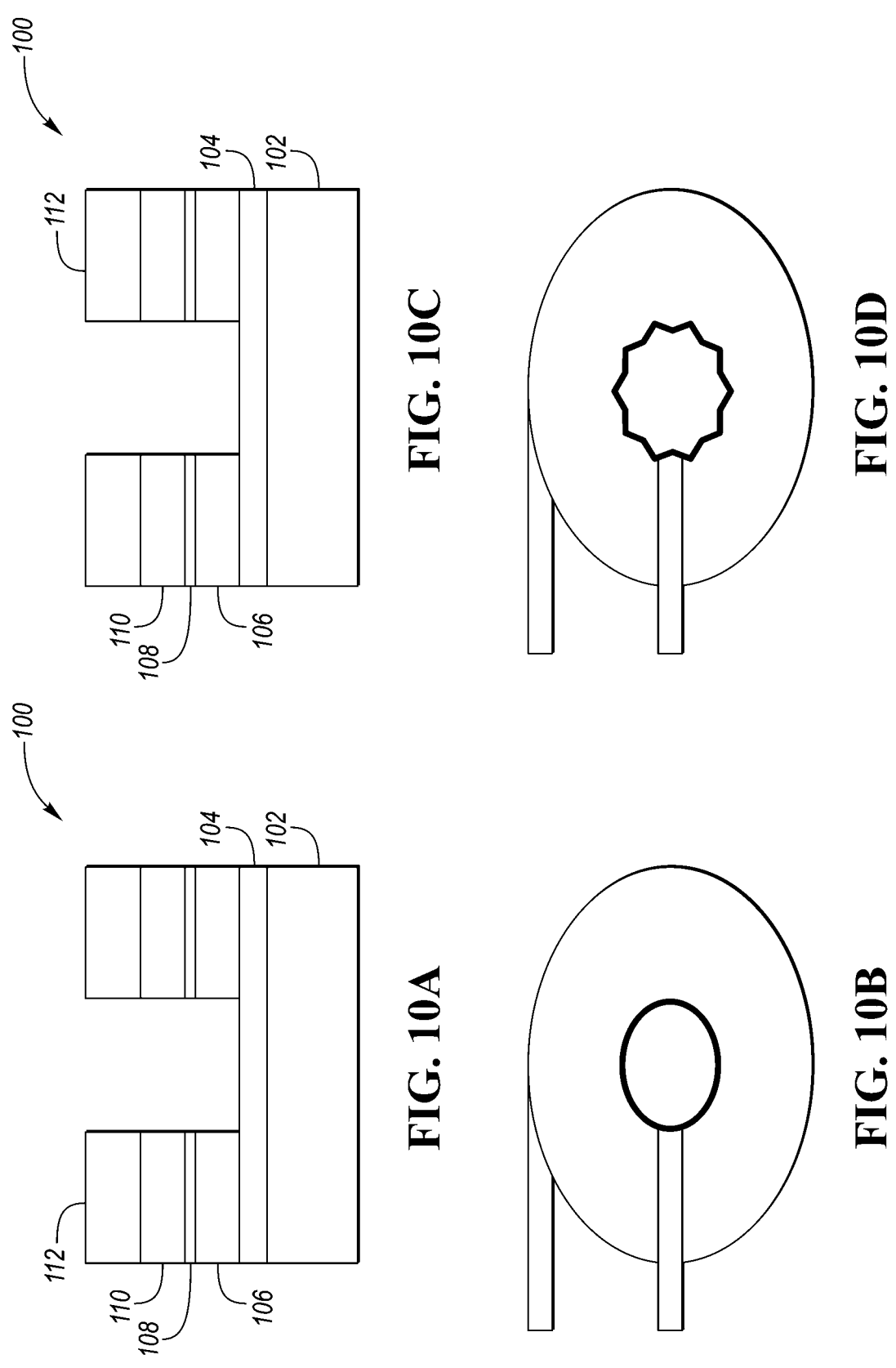
FIGS. 10A-10B illustrate a side and a top view respectively of a nanogap sensing device having a window opening with an ovular shape.
FIGS. 10C-10D illustrate a side and a top view respectively of a nanogap sensing device having a window opening with a polygonal (FIG. 10B) shape according to at least some embodiments.
Figures 11A, 11B, 11C, 11D:
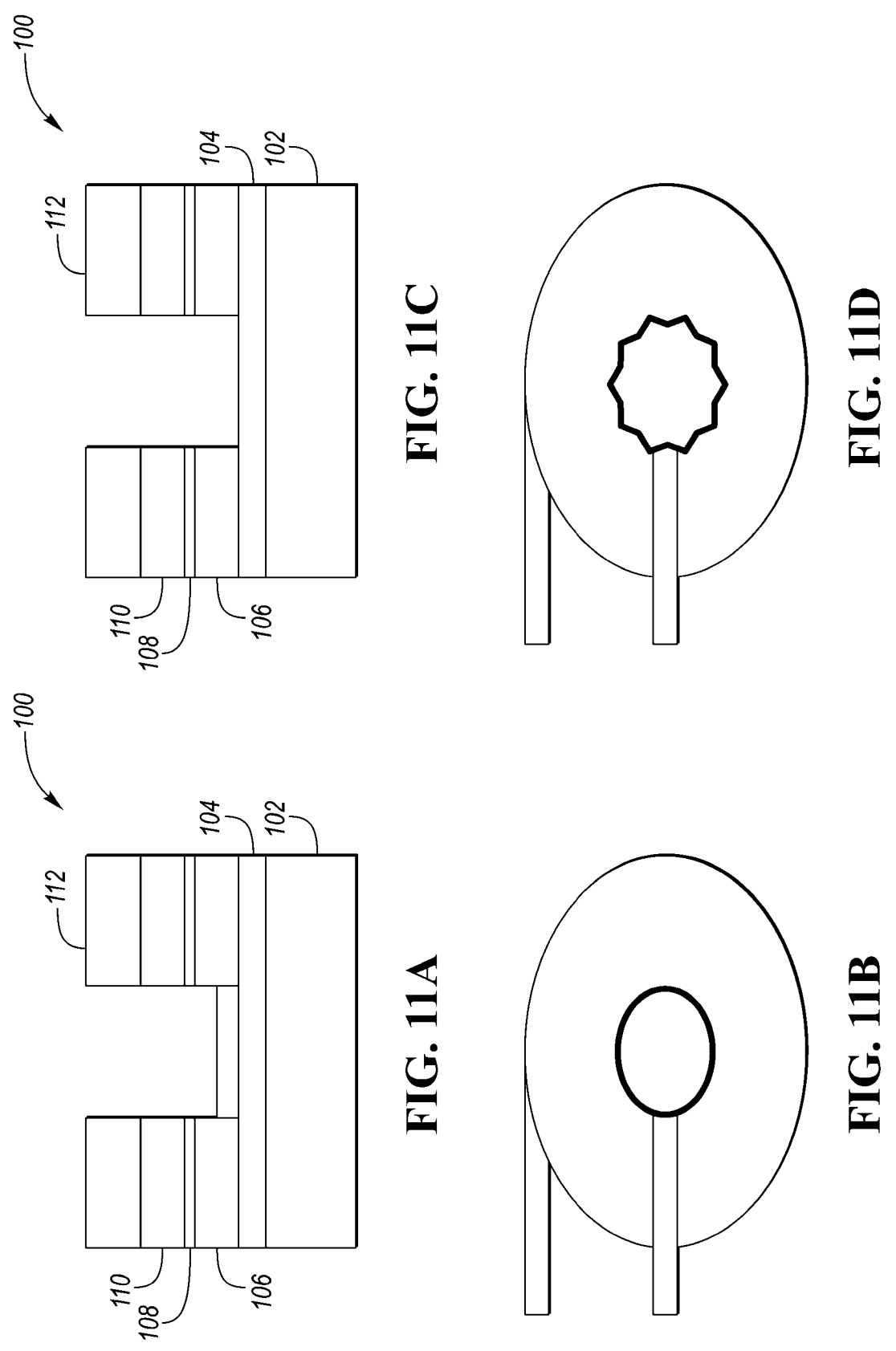
FIGS. 11A-11B illustrate a side and a top view respectively of a nanogap sensing device having a window opening with an ovular shape in which the first electrode (metal electrode 1) is not fully etched away.
FIGS. 11C-11D illustrate a side and a top view respectively of a nanogap sensing device having a window opening with a polygonal shape in which the first electrode (metal electrode 1) is not fully etched away.
Figures 12A, 12B, 13A, 13B:
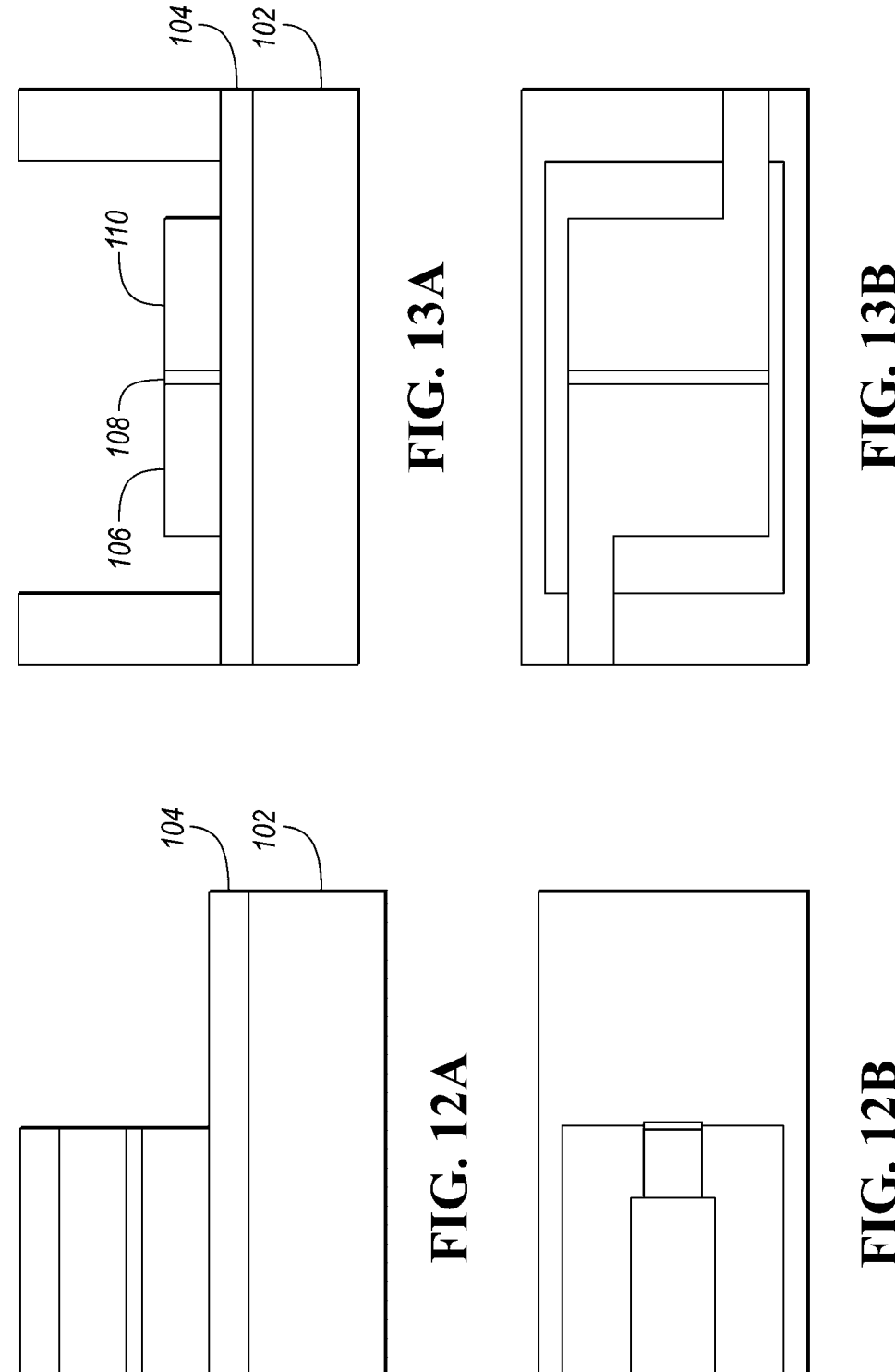
FIGS. 12A and 12B illustrate a schematic, side view and a schematic, top view, respectively, of an example of a nanogap sensing device in which the shape of the sensing zone is in the form of a single line.
FIGS. 13A and 13B illustrate a schematic, side view and a schematic, top view, respectively, of an example of a nanogap sensing device in which the electrodes are flattened and the active sensing components are facing upwards.

FIGS. 9-13 show examples of device designs that may be utilized in some embodiments. FIG. 9 illustrates an embodiment in which the first metal electrode 106 at the bottom is not fully etched away so that it maintains a larger surface area. As described for FIG. 1, the active sensing zone may be formed by etching the electrode stack in the form of a window. The sensing zone may thus be positioned along the perimeter of the window. It is recognized that the window etched into the electrode stack may be formed of any shape. In FIG. 9, a rectangular shape is shown according to an embodiment. As illustrated in FIGS. 10A and 10B, the shape of the window may be ovular for example. FIGS. 10C and 10D illustrate a polygonal-shaped window opening as an example. FIGS. 11A and 11B illustrate an example device design with an ovular-shaped window and a well compartment in which the first electrode (metal electrode 1) has not been fully etched away. FIGS. 11C and 11D illustrate a similar example design with a polygonal-shaped window opening. Since the window opening may serve as a well compartment for the reaction of reagents, the design may be related to the function of the opening. For example, the design of the window opening may be chosen based on the effect that the shape may have on parameters including but not limited to the filling, washing, and flowing of a solution. Depending on the properties of the surface and the sample solution composition, the design may be optimized to avoid problems including but not limited to bubble trapping or crosstalk with neighboring wells (in the case of multiplexing for example). FIG. 12 shows an embodiment in which the active sensing zone is in the form of a single line. FIG. 13 shows another embodiment having a design with flattened electrodes with the active sensing components facing up.

Since the nanogap electrodes are small, they may be easily integrated with a nano- or micro-channel to improve control of the reagents and samples.

Figure 14B:
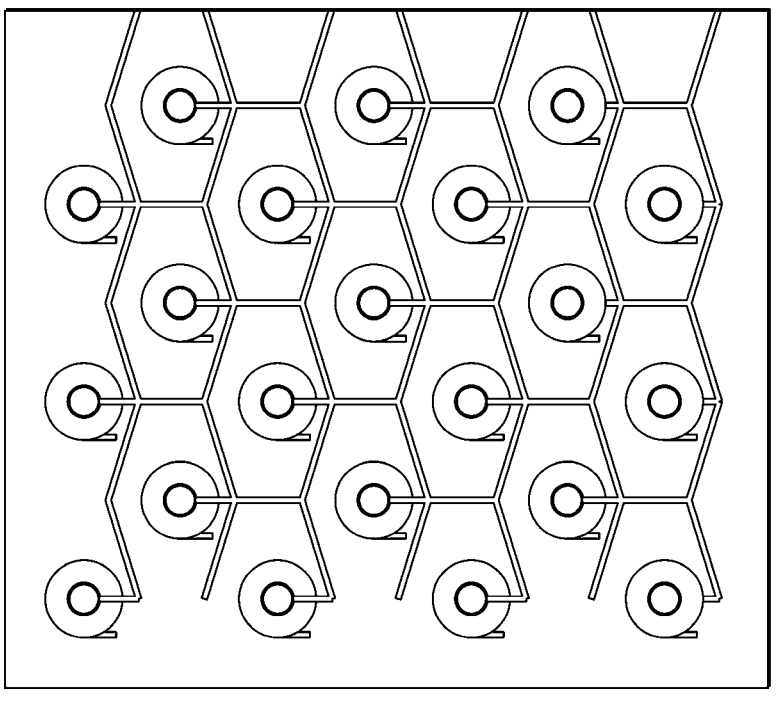
FIGS. 14A and 14B illustrate schematic examples of array formats of the nanogap sensors for a multiplexed test.
Figure 14B:
Figure 14A:
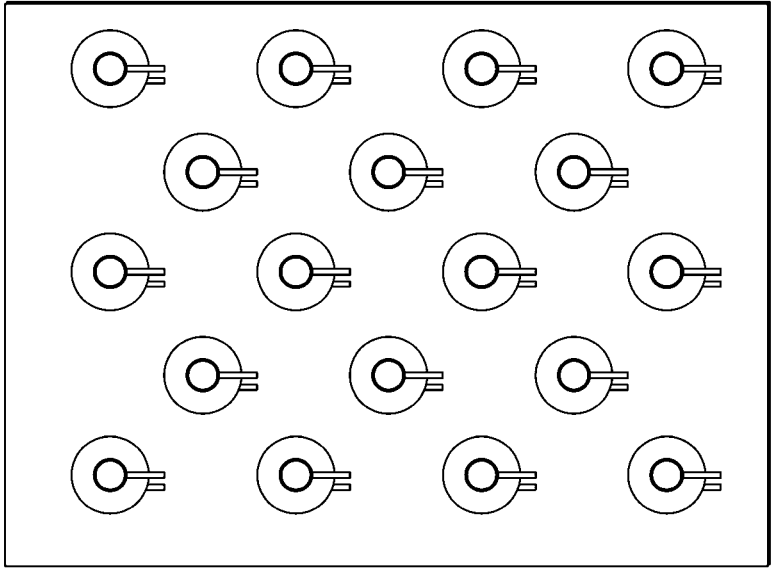
Figures 15A, 15B, 15C, 15D:
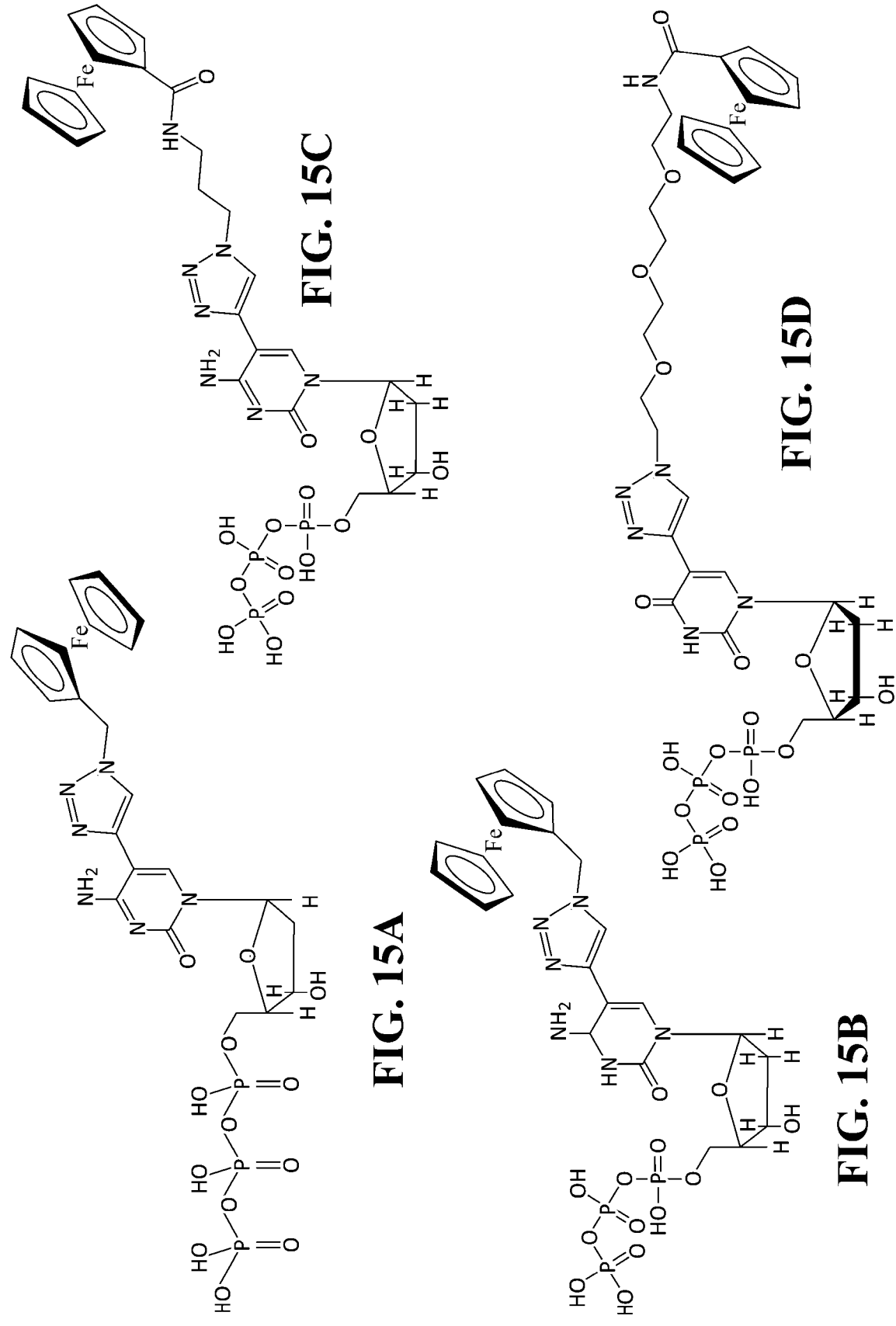
FIGS. 15A-15J illustrate examples of suitable modified dNTPs (labeled with ferrocene redox labels) that may be enzymatically incorporated into a polynucleotide strand.
Figures 15E, 15F, 15G:
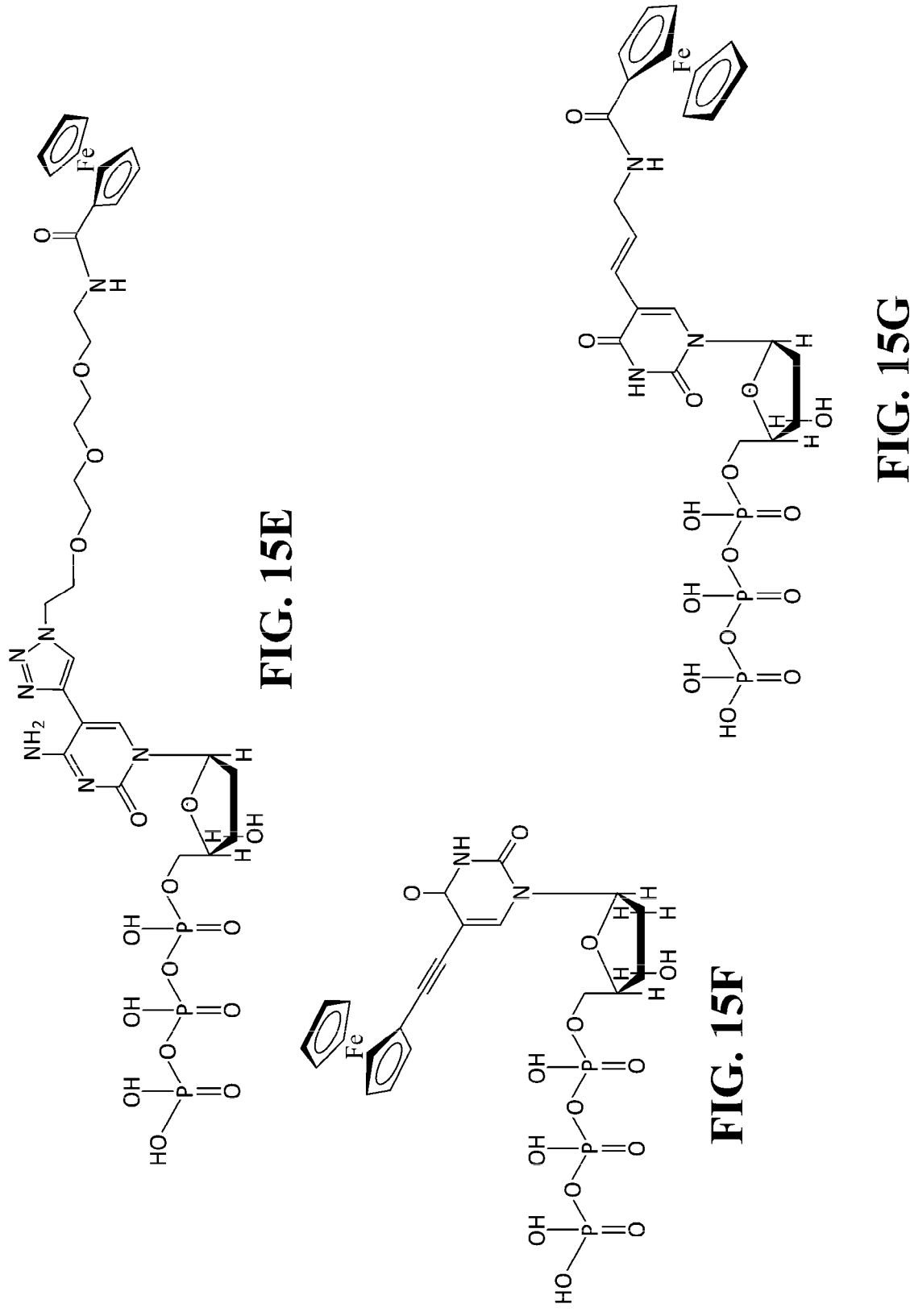
Figures 15H, 15I, 15J:
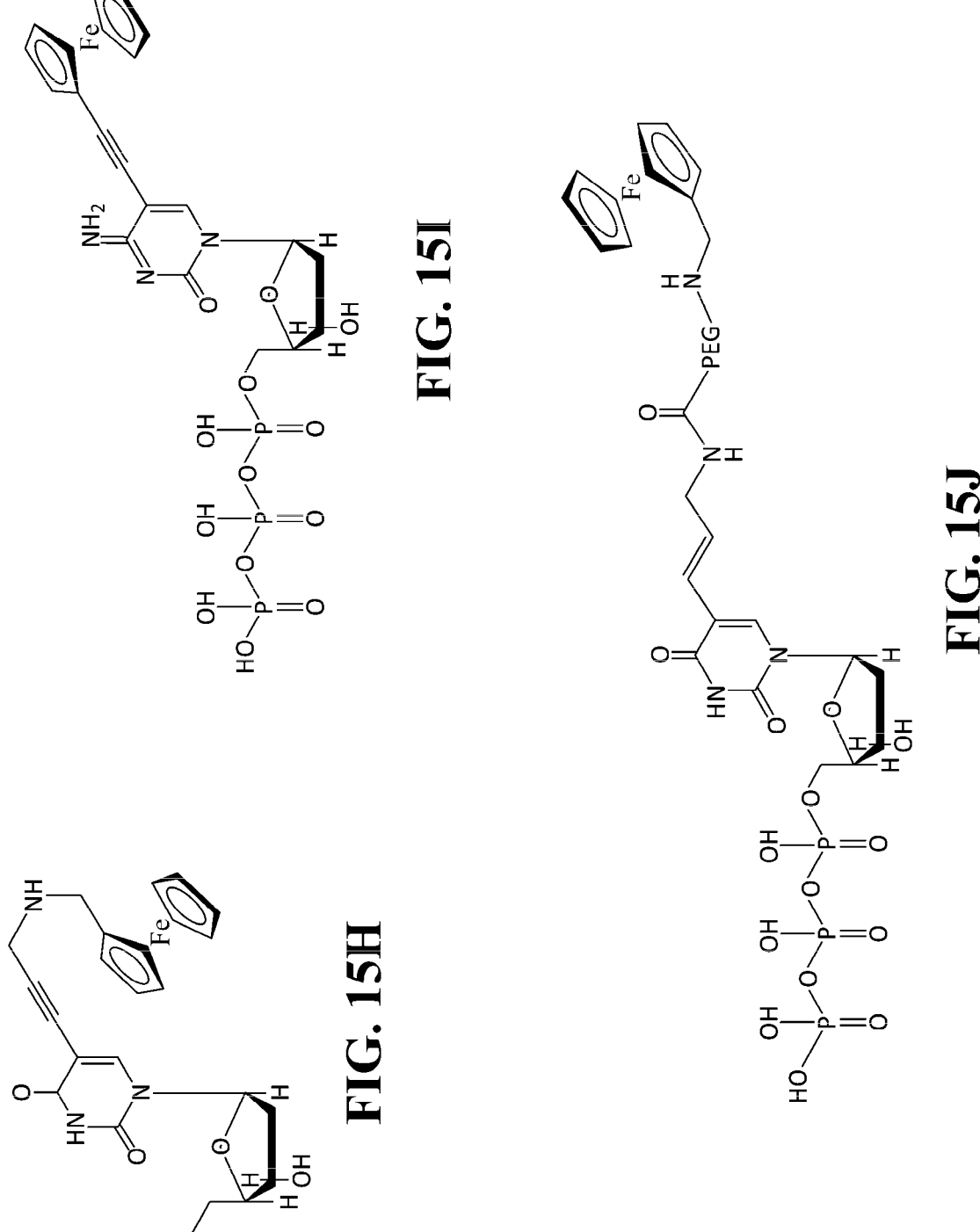

In yet other embodiments, an array of active sensing components nay be formed. Such an array may be used to perform a multiplexed test for example. FIGS. 14A and 14B show simplified versions of array designs of the sensors. The array may function as an array of microwells or in combination with a microfluidic or nanofluidic channel network. This format may be used to perform a multiplexed test. A multiplexed test may include providing samples from different patients in different microwells (also referred to as well compartments) of the array so that multiple patient samples may be tested simultaneously. A multiplexed test may also include providing primers designed to detect unique target polynucleotide strands in different microwells of the array so that more than one target polynucleotide strand may be detected using the same array. A multiplexed test may also utilize a combination of these scenarios.

FIGS. 15 through 18 illustrate examples of dNTPs modified with electroactive labels that may be enzymatically incorporated into a target polynucleotide strand. FIGS. 15A-15J illustrate examples of dNTPs modified with ferrocene electroactive labels. FIGS. 16A-16C illustrate examples of dNTPs modified with anthraquinone electroactive labels. FIGS. 17A-17B illustrate examples of dNTPs modified with methylene blue electroactive labels. FIGS. 18A-18C illustrate examples of dNTPs modified with phenothiazine electroactive labels. As depicted, the electroactive labels are covalently attached to the base of the nucleotides. In this way, the electroactive labels may remain on the polynucleotide strand.

In at least some embodiments, a system for detecting a polynucleotide strand in a sample is provided. The system may comprise a device including a metal-insulator-metal (MIM) electrode unit in which a first metal electrode is separated from a second metal electrode by a nanogap dielectric. As described above, the unit may be formed as an electrode stack. The stack may be etched to form a well compartment sized to receive a sample solution. Primers for the nucleic acid amplification may be immobilized on the surface of the thin dielectric nanogap material. To amplify target polynucleotide strands, a controller may be configured to add a sample solution containing polymerase enzymes, dNTPs, templates, and primers to the well compartment of the MIM electrode unit. At least one type of nucleotide may be labeled with a redox tag that may enhance electron transport through the nanogap via either tunneling or diffusion-based redox cycles. The controller may be configured to direct flow of the sample solution and additional reagents through a micro or nanochannel network in fluid communication with the MIM electrode unit or with an array of units. The controller may be further configured to direct signals (e.g., voltage pulses) through the first and the second electrodes, and to measure the current values from the first electrode and the second electrode to determine a baseline signal. The controller may also be configured to measure an alteration in the baseline signal over a period of time to detect the presence of the target polynucleotide strands and to quantify them.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method for detecting a polynucleotide strand in a sample comprising:
   providing a device including a nanogap sensor comprising a first electrode and a second electrode separated by a dielectric layer to form a nanogap between the first and second electrodes, the nanogap comprising the dielectric layer, wherein a primer is attached to a surface of the dielectric layer;
   providing a sample to the device, wherein the sample is a solution that includes a primer, a polymerase, a target polynucleotide strand, and at least one nucleotide modified with a redox tag, the polymerase capable of amplifying the target polynucleotide strand by incorporating the at least one nucleotide modified with a redox tag into the target polynucleotide strand to form a labeled target polynucleotide strand;
   delivering a first signal to the first electrode to generate a first current value;
   delivering a second signal to the second electrode to generate a second current value; and
   detecting the presence of the labeled target polynucleotide strand, wherein the detecting includes measuring the first and second current values to determine a baseline signal, and measuring an alteration in the baseline signal.

2. The method of claim 1, further comprising measuring a redox current value and a tunneling current value to determine the baseline signal.

3. The method of claim 1, further comprising determining a differential current value between the first electrode and the second electrode to detect the presence of the labeled target polynucleotide strand.

4. The method of claim 1, further comprising inducing incorporation of the nucleotides modified with a redox tag into the target polynucleotide strand by altering the pH of the sample solution.

5. The method of claim 1, further comprising inducing incorporation of the nucleotides modified with a redox tag into the target polynucleotide strand by treating the sample solution with light of a wavelength capable of activating an inactive polymerase.

6. The method of claim 1, wherein one of the first signal or the second signal induces oxidation and the other of the first signal or the second signal induces reduction.

7. The method of claim 1, wherein the sample solution remains in a well compartment in fluidic communication with the first electrode, the second electrode, and the dielectric layer, for the duration of the amplification and detection of the target polynucleotide strand.

8. The method of claim 1, further comprising measuring the time between establishing the baseline signal in the sample solution and detecting the measured alteration in the baseline signal to quantify a number of labeled target polynucleotide strands in the sample solution.

9. A method for detecting a polynucleotide strand in a sample comprising:
   providing a device including a nanogap sensor comprising a first electrode, a dielectric layer disposed on the first electrode, and a second electrode disposed on the dielectric layer to form an electrode stack having a nanogap comprising the dielectric layer, wherein the electrode stack includes a well compartment sized to receive a sample solution, and wherein an edge of the dielectric layer a nanocavity in which primers are attached;
   providing the sample solution to the device, wherein the sample solution includes a primer, a polymerase, a target polynucleotide strand, and at least one nucleotide modified with a redox tag, the polymerase capable of amplifying the target polynucleotide strand by incorporating the at least one nucleotide modified with a redox tag into the target polynucleotide strand to form a labeled target polynucleotide strand;
   delivering a first signal to the first electrode to generate a first current value and a second signal to the second electrode to generate a second current value; and
   detecting the presence of the labeled target polynucleotide strand, wherein the detecting includes measuring the first and second current values to determine a baseline signal, and
   measuring an alteration in the baseline signal.

10. The method of claim 9, further comprising measuring an alteration in electron transfer between the first electrode and the second electrode induced by (i) the binding to the primers in the nanocavity of an amplified target polynucleotide strand with nucleotides modified with a redox tag and (ii) the amplification in the sample solution of the target polynucleotide strand with a nucleotide modified with a redox tag.

11. The method of claim 9, wherein the sample solution remains in the well compartment for the duration of the amplification and detection of the target polynucleotide strand.

12. The method of claim 9, further comprising measuring the time between establishing the baseline signal in the sample solution and detecting the measured alteration in the baseline signal to quantify a number of labeled target polynucleotide strands in the sample solution.

13. A system for detecting a polynucleotide strand in a sample comprising:
   a device including a nanogap sensor comprising a first electrode, a dielectric layer disposed on the first electrode, and a second electrode disposed on the dielectric layer to form an electrode stack having a nanogap comprising the dielectric layer, wherein the electrode stack includes a well compartment sized to receive a sample solution, wherein the sample solution includes a primer, a polymerase, a target polynucleotide strand, and at least one nucleotide modified with a redox tag, and wherein a primer is attached to the dielectric layer in fluid communication with the sample solution; and
   a controller configured to:
   deliver a first signal to the first electrode to generate a first current value and a second signal to the second electrode to generate a second current value when the sample solution is in the device;
   measure the first and second current values to determine a baseline signal; and
   measure an alteration in the baseline signal to detect the presence of the target polynucleotide strand.

14. The system of claim 13, wherein the system further comprises an array of devices.

15. The system of claim 14, wherein the array of devices is configured for a multiplexed test.

16. The system of claim 13 further comprising a microfluidic channel network in fluid communication with the nanogap sensor.

17. The system of claim 13, wherein an edge of the dielectric layer is recessed with respect to the first electrode and the second electrode to form a nanocavity.

18. The system of claim 13, wherein the well compartment includes an aperture of an ovular shape.

19. The system of claim 13, wherein the well compartment includes an aperture of a polygonal shape.

20. The system of claim 13, wherein the electrode stack is partially etched to form a well compartment having the first electrode as a bottom surface of the well compartment.

\* \* \* \* \*